US012787982B2

(12) United States Patent
Traxler et al.

(10) Patent No.: US 12,787,982 B2
(45) Date of Patent: Nov. 10, 2026

(54) RETRACTABLE LEASH DEVICE FOR UNCOILING AND COILING AN ANIMAL LEASH

(71) Applicant: Diligent Verwaltung GmbH, Cologne (DE)

(72) Inventors: Christoph Traxler, Künzell (DE); Norbert Wülbeck, Brilon (DE)

(73) Assignee: DILIGENT VERWALTUNG GMBH, Cologne (DE)

( * ) Notice: Subject to any disclaimer, the term of this patent is extended or adjusted under 35 U.S.C. 154(b) by 0 days.

(21) Appl. No.: 19/198,729

(22) Filed: May 5, 2025

(65) Prior Publication Data

US 2025/0338827 A1 Nov. 6, 2025

(30) Foreign Application Priority Data

May 6, 2024 (EP) .................................... 24174342

(51) Int. Cl.
*A01K 27/00* (2006.01)

(52) U.S. Cl.
CPC .................................. *A01K 27/004* (2013.01)

(58) Field of Classification Search
CPC .................................................... A01K 27/004
See application file for complete search history.

(56) References Cited

U.S. PATENT DOCUMENTS 2,217,323 A * 10/1940 Sackett .............. B65H 75/4444 242/379.2
5,377,626 A * 1/1995 Kilsby ................. A01K 27/004 119/796
5,762,029 A * 6/1998 DuBois ................ A01K 27/006 119/796
(Continued)

FOREIGN PATENT DOCUMENTS

CN 102415340 A * 4/2012 ........... A01K 27/004
CN 106031357 A * 10/2016 ........... A01K 27/004
(Continued)

*Primary Examiner* — Morgan T Jordan
(74) *Attorney, Agent, or Firm* — Lippes Mathias LLP

(57) ABSTRACT

The invention relates to a retractable leash device (1) for uncoiling and coiling an animal leash (2), wherein the retractable leash device (1) comprises a housing (3), a spool body (4) rotatably mounted on the housing (3) and a return spring (5) which is designed to push back or hold back the spool body (4) into a coiling position in which the animal leash (2) is coiled onto the spool body (4). The spool body (4) can be rotated out of the coiling position against a return force of the return spring (5) for uncoiling the coiled animal leash (2), wherein a braking device (7) comprises a brake element (8) designed to brake the rotating spool body (4), wherein the braking device (7) is designed such that the brake element (8) brakes the spool body (4) as a result of a braking force automatically generated by an animal leash tension in the animal leash caused by the uncoiling of the animal leash (2). The braking device (7) comprises a brake deflection device (11) at which the animal leash (2) is
(Continued)

deflected and which is mounted on the housing (3) so as to be movable relative to the spool body (4) and which is designed to transmit the animal leash tension to the brake element (8).

11 Claims, 3 Drawing Sheets

(56) References Cited

U.S. PATENT DOCUMENTS

| | | | | | |
|---|---|---|---|---|---|
| 5,887,550 | A * | 3/1999 | Levine | A01K 27/004 | 119/796 |
| 6,003,472 | A * | 12/1999 | Matt | F21V 33/008 | 119/796 |
| 6,405,683 | B1 * | 6/2002 | Walter | A01K 27/004 | 119/772 |
| 6,526,918 | B1 * | 3/2003 | Arnold | B65H 75/4431 | 119/796 |
| 6,845,736 | B1 * | 1/2005 | Anderson | A01K 27/004 | 119/796 |
| 7,980,202 | B2 * | 7/2011 | Bentz | A01K 27/004 | 119/796 |
| 8,651,411 | B2 * | 2/2014 | Wang | A01K 27/004 | 119/796 |
| 8,904,969 | B2 * | 12/2014 | Chefetz | B65H 75/4444 | 119/796 |
| 9,339,014 | B1 * | 5/2016 | Wettermann | A01K 27/004 | |
| 9,439,400 | B2 * | 9/2016 | Bogdahn | A01K 27/004 | |
| 9,480,241 | B2 * | 11/2016 | Holmstrom | B25G 1/06 | |
| 9,723,816 | B2 * | 8/2017 | O'Brien | B65H 75/406 | |
| 9,943,071 | B2 * | 4/2018 | Hill | B65H 75/4426 | |
| 10,893,660 | B2 * | 1/2021 | Hill | B65H 75/4428 | |
| 11,033,003 | B1 * | 6/2021 | Burkhardt | B65H 75/486 | |
| 2003/0029388 | A1 * | 2/2003 | Walter | A01K 27/004 | 119/772 |
| 2003/0145803 | A1 * | 8/2003 | Muller | A01K 27/004 | 119/796 |
| 2004/0237906 | A1 * | 12/2004 | Waxman | A01K 27/004 | 119/796 |
| 2005/0011472 | A1 * | 1/2005 | Wuensche | A01K 27/004 | 119/796 |
| 2005/0172914 | A1 * | 8/2005 | Woodruff | A01K 27/004 | 119/796 |
| 2006/0207522 | A1 * | 9/2006 | Perkitny | A01K 27/006 | 119/796 |
| 2008/0173257 | A1 * | 7/2008 | Steiner | A01K 27/009 | 119/796 |
| 2008/0230015 | A1 * | 9/2008 | Bleshoy | A01K 27/004 | 119/796 |
| 2010/0107992 | A1 * | 5/2010 | Chefetz | B65H 75/4431 | 119/796 |
| 2011/0067649 | A1 * | 3/2011 | O'Brien | A01K 27/004 | 119/796 |
| 2011/0114032 | A1 * | 5/2011 | Reed | A01K 27/004 | 119/796 |
| 2011/0220036 | A1 * | 9/2011 | Matthews | B65H 75/4431 | 119/796 |
| 2012/0073516 | A1 * | 3/2012 | Ek | A01K 27/004 | 119/796 |
| 2012/0079994 | A1 * | 4/2012 | Chefetz | A01K 27/004 | 119/796 |
| 2013/0008392 | A1 * | 1/2013 | Holmstrom | A01K 27/004 | 119/796 |
| 2013/0081580 | A1 * | 4/2013 | Bogdahn | A01K 27/004 | 119/796 |
| 2014/0263799 | A1 * | 9/2014 | Baerwald | A01K 27/004 | 242/381.5 |
| 2015/0359196 | A1 * | 12/2015 | Crucs | A01K 27/009 | 119/796 |
| 2015/0359197 | A1 * | 12/2015 | Crucs | A01K 27/009 | 119/796 |
| 2016/0128305 | A1 * | 5/2016 | van Overbeek | B65H 75/4423 | 119/796 |
| 2016/0143253 | A1 * | 5/2016 | Pawlowski | A01K 27/004 | 119/796 |
| 2017/0295755 | A1 * | 10/2017 | Hill | B65H 75/4426 | |
| 2018/0027775 | A1 * | 2/2018 | Smith | A01K 27/004 | |
| 2018/0338474 | A1 * | 11/2018 | Bogdahn | B65H 75/4431 | |
| 2020/0045936 | A1 * | 2/2020 | Tang | B65H 75/4428 | |
| 2020/0205380 | A1 * | 7/2020 | Chung | B65H 75/486 | |
| 2021/0368741 | A1 * | 12/2021 | Duffin | A01K 27/004 | |
| 2025/0338828 | A1 * | 11/2025 | Traxler | A01K 27/004 | |

FOREIGN PATENT DOCUMENTS

| | | | | |
|---|---|---|---|---|
| DE | 20008014 | U1 * | 8/2000 | B65H 75/4431 |
| DE | 20017028 | U1 * | 12/2000 | A01K 27/004 |
| DE | 20019939 | U1 * | 6/2001 | B65H 75/4431 |
| DE | 20110706 | U1 * | 10/2001 | B65H 75/4423 |
| DE | 20313319 | U1 * | 10/2003 | B65H 75/44 |
| DE | 10343112 | A1 * | 4/2005 | A01K 27/004 |
| DE | 202006002147 | U1 * | 5/2006 | A01K 27/004 |
| DE | 202006010918 | U1 * | 10/2006 | A01K 27/004 |
| DE | 102006058641 | A1 * | 6/2008 | A01K 27/004 |
| DE | 202013100163 | U1 * | 2/2013 | B65H 75/4431 |
| DE | 202021104494 | U1 * | 9/2021 | A01K 27/004 |
| DE | 102021121042 | A1 * | 2/2023 | A01K 27/005 |
| EP | 0093445 | A1 * | 11/1983 | A01K 27/004 |
| FI | 20197118 | A1 * | 3/2021 | A01K 27/004 |
| FR | 3009923 | A1 * | 3/2015 | A01K 27/004 |
| GB | 2545276 | A * | 6/2017 | B65H 75/4442 |
| GB | 2634759 | A * | 4/2025 | A01K 27/008 |
| GB | 2642319 | A * | 1/2026 | B65F 1/062 |
| WO | WO-2017130001 | A1 * | 8/2017 | A01K 27/005 |

* cited by examiner

RETRACTABLE LEASH DEVICE FOR UNCOILING AND COILING AN ANIMAL LEASH

BACKGROUND OF THE DISCLOSURE

The invention relates to a retractable leash device for uncoiling and coiling an animal leash, wherein the retractable leash device comprises a housing, a spool body rotatably mounted on the housing, and a return spring, wherein the return spring is designed to push the spool body into a coiling position in which the animal leash is coiled onto the spool body, wherein the spool body can be rotated out of the coiling position against a return force of the return spring for uncoiling the coiled animal leash.

Such a retractable leash device is also commonly referred to as a flex leash or a self-retracting animal leash. Known flex leashes usually consist of an animal leash or a strap which is coiled onto a spool body on a housing-like handle. A snap hook is arranged at the end of the animal leash or strap, to which a collar of the animal to be led is attached. The spool body has a spiral spring which automatically coil the animal leash when the animal runs back to its owner or to the leash holder.

If the animal runs far enough away from the leash holder and thus from the retractable leash device so that the animal leash is completely uncoiled from the spool body, the animal experiences an abrupt jerk on its neck, with the leash holder feeling the same jerk on their hand or arm, which can even cause injury to the animal. To avoid these dangers and also to enable the animal to be stopped before it reaches the end of the unwound animal leash, it is known from the prior art to equip retractable leash devices with a brake switch which mechanically engages in the spool body and blocks further rotation of the spool body and thus further uncoiling of the animal leash. It is also known that a brake switch brakes the rotation of the spool body until it comes to a standstill, whereby the attainment of the standstill and the effect of the braking depend on the force applied to the brake switch by the leash holder. It is not particularly advantageous that the braking effect achieved by means of the brake switch depends solely on the force of the leash holder.

SUMMARY OF THE DISCLOSURE

The invention is based on the task of creating a solution that provides a simplified, improved, and more effective retractable leash device in a structurally simple and inexpensive manner and avoids the disadvantages of known retractable leashes.

This task is solved by a retractable leash device for uncoiling and coiling an animal leash with the features according to claim 1.

The retractable leash device according to the invention for uncoiling and coiling an animal leash comprises a housing, a spool body rotatably mounted on the housing, and a return spring, wherein the return spring is designed to push the spool body back into a coiling position, in which the animal leash is coiled onto the spool body, wherein the spool body can be rotated out of the coiling position against a return force of the return spring in order to uncoil the coiled animal leash, wherein a braking device comprises a brake element designed to brake the rotating spool body, wherein the braking device is designed such that the brake element brakes the spool body as a result of a braking force automatically generated by an animal leash tension in the animal leash caused by the uncoiling of the animal leash, and wherein the braking device comprises a brake deflection device at which the animal leash is deflected and which is mounted on the housing so as to be movable relative to the spool body and which is designed to transmit the animal leash tension to the brake element.

Advantageous and practical embodiments and further developments of the invention are apparent from the corresponding subclaims.

The invention provides a retractable leash device which solves the above-mentioned problems in a structurally simple manner. The self-winding retractable leash device according to the invention comprises a braking device which is designed in such a way that the braking element brakes the spool body as a result of a braking force automatically generated by the tension of the animal leash caused by the uncoiling of the animal leash. In the sense of the invention, "braking" means both blocking the spool body against further uncoiling of the animal leash by means of friction and slowing down the spool body by means of friction, thereby slowing down the uncoiling of the animal leash. With the help of the retractable leash device according to the invention, it is possible for the brake element to brake the spool body as a result of a braking force automatically generated by the tension in the animal leash caused by the uncoiling of the animal leash before the end of the animal leash is reached. In this way, the invention provides a retractable leash device which has an automatic braking function, namely when the rope tension or animal leash tension is so high due to the animal running away from the retractable leash device that the braking device automatically brakes or slows down the rotation of the spool body. Since the animal leash tension contributes to the braking force via the brake deflection device, the braking force can be varied by the leash guide or user of the retractable leash device holding the animal leash relative to the housing and thus the brake deflection device in such a way that less, no or more force is transmitted to the brake element via the deflection of the animal leash.

In terms of minimal installation space, it is particularly advantageous in an embodiment of the invention if the braking device comprises a brake lever which is mounted on a pivot axis on the housing and to which the brake element is attached.

To ensure that the animal leash is automatically coiled up and that the brake lever does not prevent automatic uncoiling, the invention provides that the brake lever is movable against the force of a return element from a rest position, in which the spool body can rotate freely, into a braking position, in which the braking force of the brake element brakes the rotation of the spool body. By designing the return spring, whose return force determines the animal leash tension, the return element of the brake element, and a coefficient of friction, the retractable leash device can be designed so that a braking effect ranging from no braking at all to locking can be determined solely by the alignment of the housing relative to the animal leash. If the housing is rotated in such a way that a force component presses on the brake element, a braking effect is produced.

To prevent damage to the retractable leash device, it is particularly advantageous in the embodiment of the invention if a stop element is arranged on the housing, which limits movement of the brake lever in the direction of the braking position at an end braking position.

In order to prevent the animal leash from becoming blocked when it uncoils, the invention provides in a further embodiment that the brake element is attached to the brake lever via a spring element in such a way that, when the end braking position is reached, only a maximum spring force of the spring element acts as a braking force on the rotating spool body.

For optional manual braking by the leash holder or user of the retractable leash device in addition to the possibility of automatic braking, the invention provides that a brake switch is movably mounted on the housing, wherein the braking device is further designed such that the brake element brakes the spool body as a result of a braking force automatically generated by manual actuation of the brake switch and/or as a result of the animal leash tension caused by the uncoiling of the animal leash. With the aid of the brake switch, it is then possible with the retractable leash device according to the invention (firstly) that the brake element brakes the spool body as a result of a braking force generated by manual operation of the brake switch, or (secondly) that the brake element brakes the spool body as a result of a braking force automatically generated by the animal leash tension caused by the uncoiling of the animal leash, or (thirdly) that the brake element brakes the spool body as a result of a braking force automatically generated by manual operation of the brake switch and by the animal leash tension caused by the uncoiling of the animal leash before the end of the animal leash is reached. In this way, the invention provides a retractable leash device which has an automatic braking function with brake force amplification if necessary, namely when the brake switch is actuated and at the same time the leash tension or animal leash tension caused by the animal running away from the retractable leash device is such that the braking device brakes the rotation of the spool body in a self-reinforcing manner.

In a further embodiment of the invention, it is particularly advantageous in terms of design with regard to minimal space requirements if the brake switch is attached to the brake lever.

In a further embodiment of the invention, it is particularly advantageous in terms of design if the brake lever is designed as a single-sided lever and the brake deflection device is arranged at the free end of the lever.

For automatic braking of the rotating spool body, it is structurally advantageous if the brake deflection device is designed as a deflection roller that is rotatably mounted and movable relative to the coil body.

Alternatively, for automatic braking of the rotating spool body, it may be advantageous in another embodiment if the brake deflection device is designed as a through-hole opening which is movable relative to the housing and the spool body.

It is particularly advantageous in terms of design if, in a further embodiment of the invention, the through-hole opening is formed on the brake lever.

For an automatic braking of the rotating spool body, the invention also advantageously provides that the spool body is mechanically coupled to a limiting device and that the limiting device is designed to push the brake lever toward the braking position after a predetermined number of rotations of the spool body. In this way, the uncoiling spool body is braked before reaching the end of the animal leash.

Finally, in a further embodiment of the invention, it is structurally advantageous that the brake element has a brake shoe which is designed to be brought into contact with a brake surface of the spool body in order to brake the rotating spool body.

It is understood that the features mentioned above and those to be explained below can be used not only in the combination specified in each case, but also in other combinations or alone without leaving the scope of the present invention. The scope of the invention is defined only by the claims.

BRIEF DESCRIPTION OF THE DRAWINGS

Further details, features, and advantages of the subject matter of the invention will become apparent from the following description in conjunction with the drawings, in which preferred embodiments of the invention are illustrated by way of example.

The drawing shows.

DETAILED DESCRIPTION OF THE PREFERRED EMBODIMENTS

Figure 1:
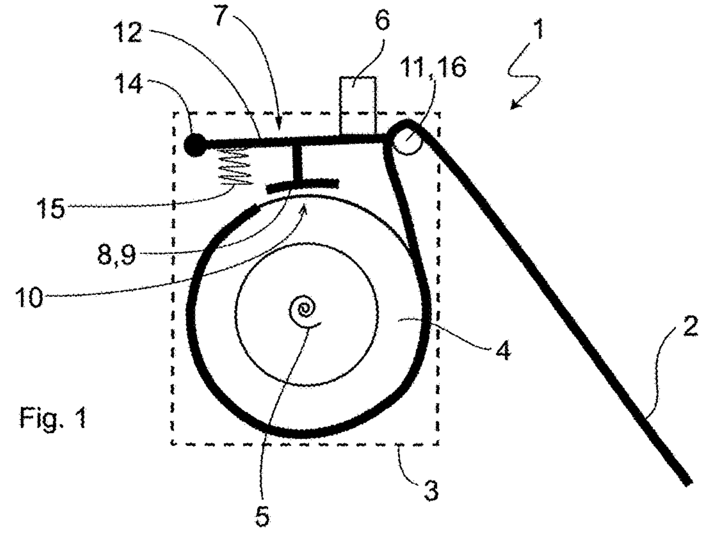
FIG. 1 a schematic representation of a retractable leash according to a first embodiment of the invention, FIG. 2 a schematic representation of the retractable leash device shown in FIG. 1, in which a braking force is generated as a result of manual actuation of a brake switch, FIG. 3 a schematic representation of the retractable leash device shown in FIG. 1, in which a braking force is generated automatically as a result of manual actuation of the brake switch and additionally as a result of animal leash tension caused by the uncoiling of an animal leash, FIG. 4 a schematic representation of a retractable leash device according to the invention in accordance with a second embodiment with a limitation of a braking force, FIG. 5 a schematic representation of the retractable leash device from FIG. 4 with decreasing animal leash tension, FIG. 6 a schematic representation of a retractable leash device according to the invention in a third embodiment with a length limitation for the uncoiling of the animal leash, FIG. 7 a perspective view of a retractable leash device according to the invention in a fourth embodiment, FIG. 8 a further perspective view of the retractable leash device shown in FIG. 7, with one half of the housing of the retractable leash device omitted, and FIG. 9 a top view of the retractable leash device shown in FIG. 8.
Figure 2:
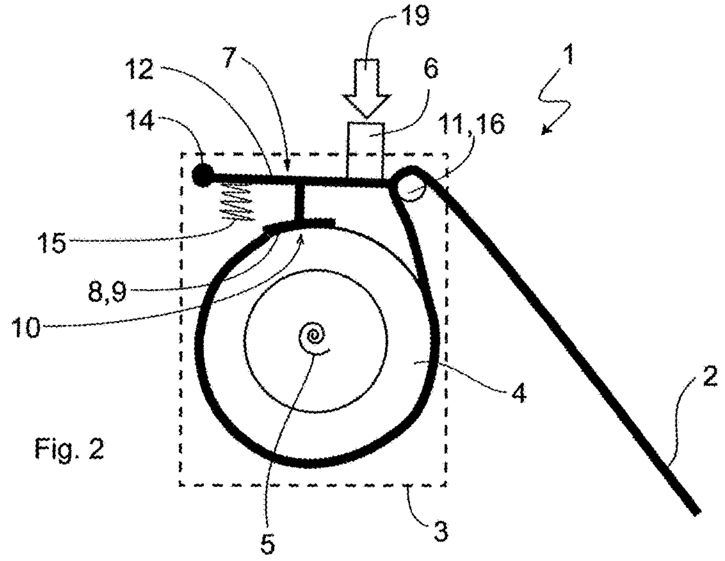
Figure 3:
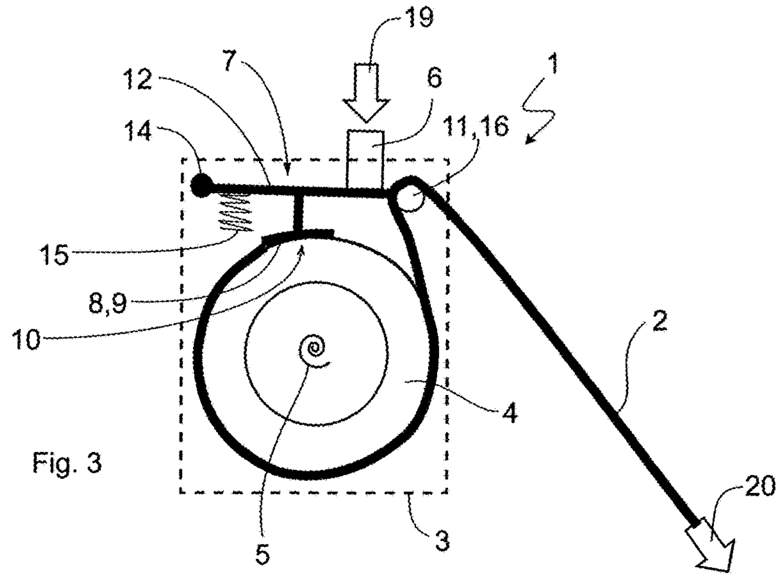
Figure 4:
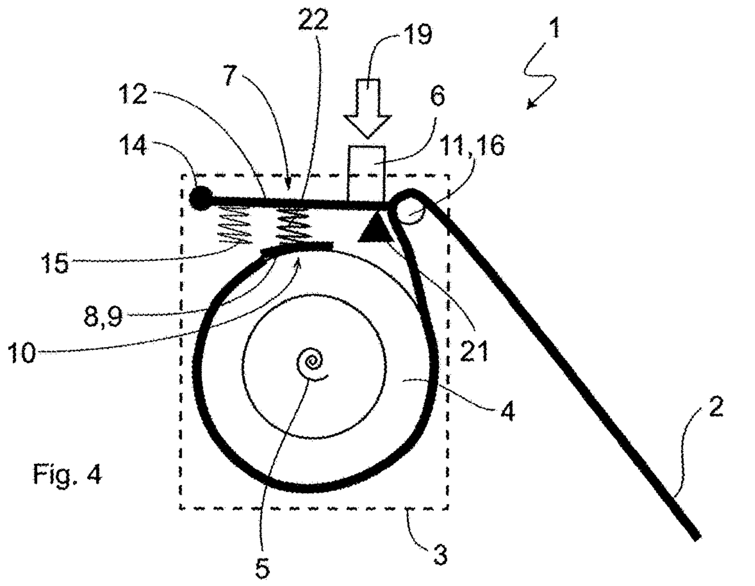
Figure 5:
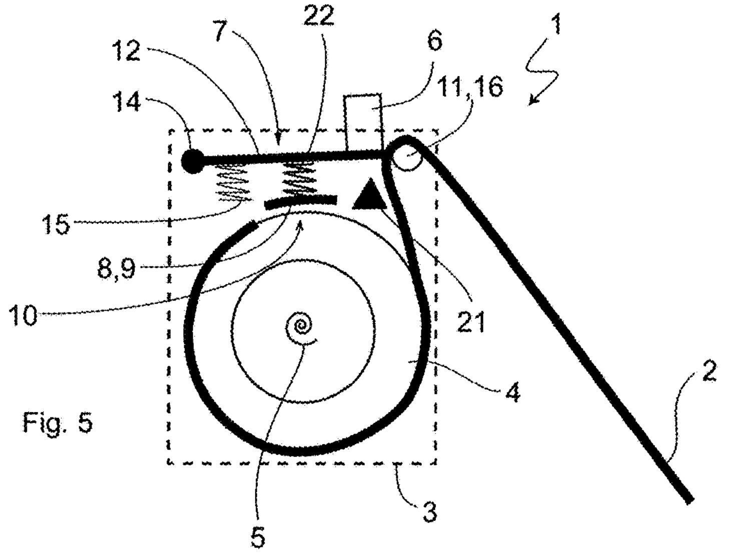
Figure 6:
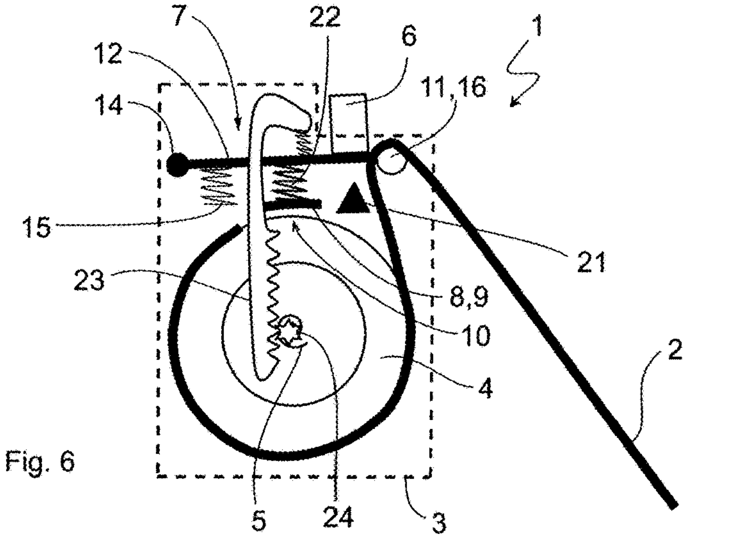
Figure 7:
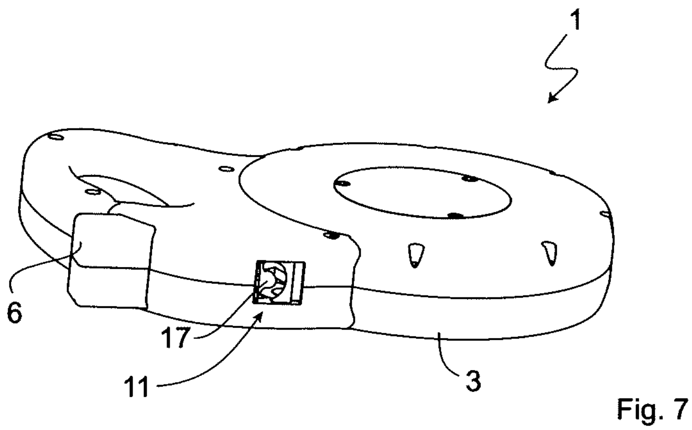
Figure 8:
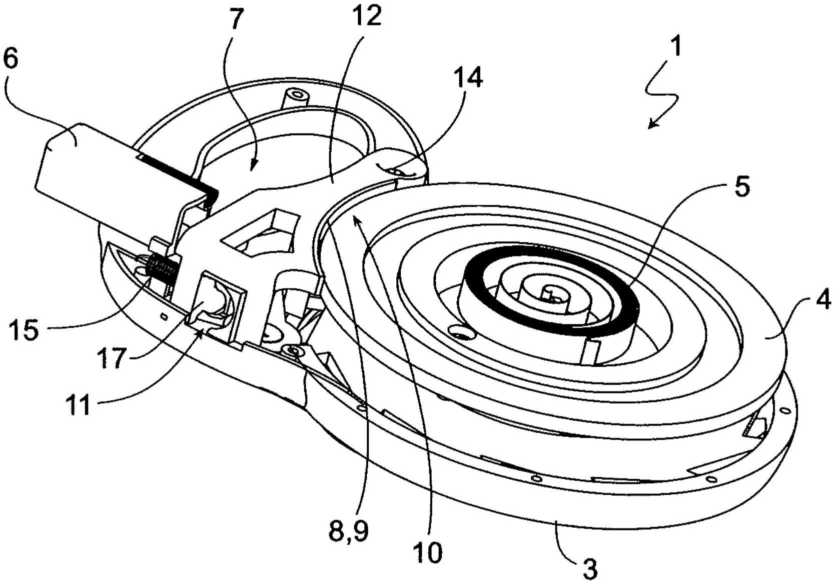
Figure 9:
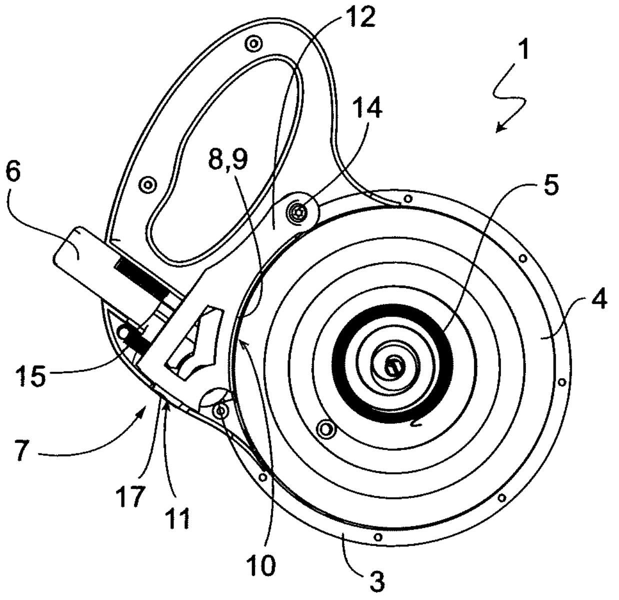

FIGS. 1 to 9 show different embodiments of a retractable leash device 1 according to the invention, wherein FIGS. 1 to 3 show a first embodiment, FIGS. 4 and 5 show a second embodiment, FIG. 6 shows a third embodiment, and FIGS. 7 to 9 show a fourth embodiment. In FIGS. 1 to 9, the same reference signs refer to the same components, so that the description of such components is to be understood as generally applicable to all embodiments, even if this is not explicitly mentioned in the description of the individual figures.

The general structure of the retractable leash device 1 according to the invention is apparent from all the figures, so that the following description refers to all the figures, whereby the retractable leash device is shown only schematically in FIGS. 1 to 7. The retractable leash device 1 for uncoiling and coiling an animal leash 2 (shown only in FIGS. 1 to 6) comprises a housing 3 (indicated by dashed lines in FIGS. 1 to 6), a spool body 4 mounted rotatably on the housing 3, and a return spring 5. The return spring 5 is designed such that the return spring 5 pushes back or holds back the spool body 4 into a coiling position in which the animal leash 2 is coiled onto the spool body 4. The spool body 4 can be rotated out of the coiling position against a return force of the return spring 5 so that the coiled animal leash 2 can uncoil. A brake switch 6 is also provided, which is movably mounted on the housing 3. According to the invention, the retractable leash device 1 comprises a braking device 7. The braking device 7 itself has a brake element 8. The brake element 8 is designed to brake the rotating spool body 4 when the animal leash 2 uncoils. As can be seen from the figures, the brake element 8 can have a brake shoe 9 which is designed to be brought into contact with a brake surface 10 of the spool body 4 in order to brake the rotating spool body 4. The brake surface 10 can be designed as a section of a circumferential wall of the spool body 4.

According to the invention, the braking device 7 is designed such that the brake element 8 brakes the spool body 4 as a result of manual actuation of the brake switch 6 and/or as a result of a braking force automatically generated by the tension of the animal leash caused by the uncoiling of the animal leash 2, as will be explained in detail below. The design according to the invention makes it possible (firstly) that the brake element 8 brakes the coil body 4 as a result of a braking force generated by manual operation of the brake switch 6, or (secondly) that the brake element 8 brakes the coil body 4 as a result of a braking force automatically generated by the animal leash tension caused by the uncoiling of the animal leash 2, or (thirdly) that the brake element 8 brakes the spool body 4 as a result of a braking force automatically generated by manual actuation of the brake switch 6 and additionally by the animal leash tension 20 caused by the uncoiling of the animal leash 2, before the end of the animal leash 2 is reached. The second and third types of braking are realized according to the invention by the fact that the braking device 7 has a brake deflection device 11, at which the animal leash 2 is deflected and which is mounted on the housing 3 so as to be movable relative to the spool body 4 and which is designed to transmit the animal leash tension 20 to the brake element 8. This allows either the braking force of the brake switch 6 to be increased or automatic braking to occur when the brake switch 6 is not actuated if the animal moves away from the animal leash holder at a correspondingly high speed and the animal leash 2 uncoils from the spool body 4 at a correspondingly high speed.

With reference to FIGS. 1 to 9, it can be seen that the braking device 7 comprises a brake lever 12. The brake lever 12 is mounted on a pivot axis 14 on the housing 3. The brake switch 6 and the brake element 8 are also attached to the brake lever 12. The brake lever 12 is movable against the force of a return element 15 from a rest position (see, for example, FIGS. 1, 5, and 6), in which the spool body 4 can rotate freely, into a braking position (see, for example, FIGS. 2 to 4), in which the braking force of the brake element 8 brakes the rotation of the spool body 4. As can be seen from FIGS. 1 to 9, the brake lever 12 is designed as a single-sided lever, whereby in the embodiments shown in FIGS. 1 to 9, the brake deflection device 11 is arranged at the free end of the lever. However, other arrangements of the brake deflection device 11 on the brake lever 12 are also conceivable.

In FIGS. 1 to 6, the brake deflection device 11 is designed as a deflection roller 16 which is rotatably mounted and movable relative to the spool body 4.

FIGS. 1 to 3 show a first embodiment of the retractable leash device 1 according to the invention, the structure of which has been described above. In FIG. 1, the return element 15, which is designed as a spring element, holds the brake lever 12 in its rest position so that the brake element 8 is spaced apart from the spool body 4 and no braking of the rotation of the spool body 4 occurs. The tension of the animal leash 2 in FIG. 1 is negligible, so that the return force of the return spring 5 counteracts this tension and the braking device 7 is not triggered. In FIG. 2, in contrast to FIG. 1, the brake switch 6 is actuated by the user of the retractable leash device 1 and pressed with an actuating force 19. This actuating force 19 leads, via the brake lever 12 as a result of the lever action, to an increased braking force or increased brake pressure of the brake element 8 on the brake surface 10, so that rotation of the spool body 4 and thus uncoiling of the animal leash 2 is braked. This braking force results in a rope tension which is perceived by the leashed animal. FIG. 3 shows a different situation in which an actuating force 19 is applied by the leash holder via the brake switch 6 and in which, in addition, animal leash tension 20 prevails due to an animal moving away quickly from the leash holder. The animal leash tension 20 acts via the brake deflection device 11 according to the pulley principle with a factor in addition to the actuating force 19 of the leash holder on the braking device 7 and the brake lever 12, so that the braking force results from the addition of both forces. The braking device 7 thus acts as a kind of brake force amplifier when the force exerted by the animal leash tension 20 is less than the user force. If the force exerted by the animal leash tension 20 is greater than the user force, the braking device 7 locks abruptly as a result of its self-reinforcement.

FIG. 4 shows a second embodiment of the retractable leash device 1 according to the invention. In this embodiment, a stop element 21 is arranged on the housing 3, which limits movement of the brake lever 12 in the direction of the braking position at an end braking position (see FIG. 4). This limitation prevents the spool body 4 from becoming blocked by limiting the braking force. The brake deflection device 11 or the brake lever 12 moves against the stop element 21 when the animal leash 2 uncoils, so that only a maximum force is transmitted from the brake lever 12 to the brake element 8, regardless of whether the brake switch 6 is actuated and/or animal leash tension with corresponding force acts on the brake deflection device 11 and thus on the brake lever 12. The maximum force is predetermined by means of a spring element 22. As can be seen in FIG. 4, the brake element 8 is attached to the brake lever 12 via the spring element 22 in such a way that when the end braking position is reached (see FIG. 4), in which the brake lever 12 rests against the stop element 21, only a maximum spring force or the maximum force of the spring element 22 acts as the braking force on the rotating spool body 4. FIG. 5 shows the second embodiment again, but in a situation in which the animal leash tension has slackened, whereby the actuating pressure 19 no longer acts on the brake switch 6 or the leash holder no longer actuates or presses the brake switch 6. In the situation shown in FIG. 5, the brake lever 12 moves back to its rest position with the aid of the return element 15, whereby the braking device 7 is no longer active and effective and the animal leash 2 is coiled onto the spool body 4 by the return spring 5.

FIG. 6 shows a third embodiment of the retractable leash device 1 according to the invention, wherein all components and features of the first and second embodiments described above are implemented in this embodiment. The third embodiment is supplemented by a further functionality. In the third embodiment, a braking force is automatically applied only as a function of the length of the animal leash 2 that has been uncoiled, without the need for a sufficiently high animal leash tension to be present for this automatic mechanism due to an animal quickly moving away from the leash guide. Accordingly, in the third embodiment shown in FIG. 6, that a corresponding mechanism is automatically triggered after a predetermined number of rotations of the spool body 4, which corresponds to a predetermined length of the uncoiled animal leash 2, so that the animal first feels a braking force before a "jerk" of the leash end, which the animal itself has caused via the animal leash tension. Accordingly, in the fourth embodiment, the spool body 4 is mechanically coupled to a limiting device 23, wherein the limiting device 23 is designed to push the brake lever 12 toward the braking position after a predetermined number of rotations of the spool body 4. For mechanical coupling, the limiting device 23, which is designed in the manner of a rack, engages with a gear wheel 24 which is arranged on the axis of the spool body 4.

FIGS. 7 to 9 show a fourth embodiment of the retractable leash device 1 according to the invention. The fourth embodiment corresponds in its structure to the first embodiment, wherein a handle is formed on the housing 3. In contrast to the other embodiments, in the fourth embodiment, the brake deflection device 11 is designed as a through-hole opening 17. The through-hole opening 17 is movable relative to the housing 3 and the spool body 4. As can be seen in particular from FIGS. 8 and 9, the through-hole opening 17 is formed on the brake lever 12, which is pivotably mounted on the housing 3. It is understood that features described for the first, second, and third embodiments and shown schematically in the figures can also be transferred to the fourth embodiment in any combination.

The invention described above is characterized by a novel braking principle which, on the one hand, increases the braking force. On the other hand, with suitable dimensioning of the lever ratios and spring forces, this novel braking principle can also be used to trigger braking depending on the position of the housing 3 relative to the animal simply by the orientation of the animal leash 2. This makes it possible to automatically brake animals moving away from the leash holder without the leash holder having to activate the brake switch 6 for this purpose. This automatic braking is possible by orienting the housing 3 so that the animal leash tension points in the correct direction, so that the brake element 8 is pressed against the spool body 4.

The invention described above is, of course, not limited to the embodiments described and illustrated. It is apparent that numerous modifications can be made to the embodiments shown in the drawings which are obvious to a person skilled in the art in accordance with the intended application without leaving the scope of the invention. The invention includes everything contained in the description and/or shown in the drawings, including anything which is obvious to a person skilled in the art in deviation from the specific embodiments.

LIST OF REFERENCE SIGNS

1 Retractable leash device
2 Animal leash
3 Housing
4 Spool body
5 Return spring
6 Brake switch
7 Braking device
8 Brake element
9 Brake shoe
10 Brake surface
11 Brake deflection device
12 Brake lever
14 Pivot axis
15 Return element
16 Deflection roller
17 Through-hole opening
18 Actuating force
19 Actuating force
20 Animal leash tension
21 Stop element
22 Spring element
23 Limiting device
24 Gear wheel

The invention claimed is:

1. A retractable leash device for uncoiling and coiling an animal leash, comprising a housing, a spool body rotatably mounted on the housing, and a return spring,
- wherein the return spring is designed to push back or hold back the spool body into a coiling position in which the animal leash is coiled onto the spool body,
- wherein the spool body is configured to rotate out of the coiling position against a return force of the return spring for uncoiling the coiled animal leash,
- wherein a braking device comprises a brake element designed to brake the rotating spool body,
- wherein the braking device is designed such that the brake element brakes the spool body as a result of a braking force generated by an animal leash tension in the animal leash caused by the uncoiling of the animal leash,
- wherein the braking device comprises a brake lever which is mounted on a pivot axis on the housing and to which the brake element is attached,
- wherein the brake lever is designed as a single-sided lever, and
- wherein the braking device comprises a brake deflection device at which the animal leash is deflected, which is arranged at the free end of the lever and which is mounted on the housing so as to be movable relative to the spool body and which is designed to transmit the animal leash tension to the brake element, and the brake deflection device.

2. The retractable leash device according to claim 1, wherein the brake lever is movable against the force of a return element from a rest position, in which the spool body can rotate freely, into a braking position, in which the braking force of the brake element brakes the rotation of the spool body.

3. The retractable leash device according to claim 2, wherein a stop element is arranged on the housing, which limits movement of the brake lever in the direction of the braking position at an end braking position.

4. The retractable leash device according to claim 3, wherein the brake element is attached to the brake lever via a spring element in such a way that, when the end braking position is reached, only a maximum spring force of the spring element acts as a braking force on the rotating spool body.

5. The retractable leash device according to claim 1, wherein a brake switch is movably mounted on the housing, and wherein the braking device is further designed such that the brake element brakes the coil spool body as a result of a braking force generated by manual actuation of the brake switch and/or as a result of the animal leash tension caused by the uncoiling of the animal leash.

6. The retractable leash device according to claim 5, wherein the brake switch is mounted on the brake lever.

7. The retractable leash device according to claim 1, wherein the brake deflection device is designed as a deflection roller which is rotatably mounted and movable relative to the spool body.

8. The retractable leash device according to claim 1, wherein the brake deflection device is designed as a through-hole opening which is movable relative to the housing and to the spool body.

9. The retractable leash device according to claim 8, wherein the through-hole opening is formed on the brake lever.

10. The retractable leash device according to claim 1, wherein the spool body is mechanically coupled to a limiting device and the limiting device is designed to push the brake lever in the direction of the braking position after a predetermined number of rotations of the spool body.

11. The retractable leash device according to claim 1, wherein the brake element comprises a brake shoe which is designed to be brought into contact with a brake surface of the spool body in order to brake the rotating spool body.

* * * * *